US008364314B2

(12) United States Patent
Abdallah et al.

(10) Patent No.: US 8,364,314 B2
(45) Date of Patent: Jan. 29, 2013

(54) METHOD AND APPARATUS FOR AUTOMATIC CONTROL OF A HUMANOID ROBOT

(75) Inventors: Muhammad E Abdallah, Houston, TX (US); Robert Platt, Houston, TX (US); Charles W. Wampler, II, Birmingham, MI (US); Matthew J Reiland, Oxford, MI (US); Adam M Sanders, Holly, MI (US)

(73) Assignees: GM Global Technology Operations LLC, Detroit, MI (US); The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 619 days.

(21) Appl. No.: 12/624,445

(22) Filed: Nov. 24, 2009

(65) Prior Publication Data

US 2010/0280663 A1 Nov. 4, 2010

Related U.S. Application Data

(60) Provisional application No. 61/174,316, filed on Apr. 30, 2009.

(51) Int. Cl.
*G06F 19/00* (2011.01)

(52) U.S. Cl. .......................................... 700/264; 901/30

(58) Field of Classification Search .................. 700/245, 700/258, 260–264, 250, 29, 31, 59, 63; 318/568.11–568.17; 901/30–35
See application file for complete search history.

(56) References Cited

U.S. PATENT DOCUMENTS

| | | | | |
|---|---|---|---|---|
| 7,113,849 | B2 * | 9/2006 | Kuroki et al. | 700/245 |
| 7,383,100 | B2 * | 6/2008 | Ng-Thow-Hing et al. | 700/245 |
| 7,403,835 | B2 * | 7/2008 | Sandner et al. | 700/253 |
| 7,747,351 | B2 * | 6/2010 | Tsusaka et al. | 700/245 |
| 2005/0125099 | A1 | 6/2005 | Mikami et al. | |
| 2007/0010913 | A1 | 1/2007 | Miyamoto et al. | |
| 2010/0138039 | A1 * | 6/2010 | Moon et al. | 700/245 |

FOREIGN PATENT DOCUMENTS

| | | | |
|---|---|---|---|
| JP | 4178708 | A | 6/1992 |
| JP | 7080787 | A | 3/1995 |
| JP | 2005125460 | A | 5/2005 |
| JP | 2007015037 | A | 1/2007 |
| JP | 2007075929 | A | 3/2007 |

OTHER PUBLICATIONS http://robotics.nasa.gov/courses/fall2002/event/oct1/NASA_Robotics_20021001.htm.

* cited by examiner

*Primary Examiner* — Dalena Tran
(74) *Attorney, Agent, or Firm* — Quinn Law Group, PLLC

(57) ABSTRACT

A robotic system includes a humanoid robot having a plurality of joints adapted for force control with respect to an object acted upon by the robot, a graphical user interface (GUI) for receiving an input signal from a user, and a controller. The GUI provides the user with intuitive programming access to the controller. The controller controls the joints using an impedance-based control framework, which provides object level, end-effector level, and/or joint space-level control of the robot in response to the input signal. A method for controlling the robotic system includes receiving the input signal via the GUI, e.g., a desired force, and then processing the input signal using a host machine to control the joints via an impedance-based control framework. The framework provides object level, end-effector level, and/or joint space-level control of the robot, and allows for functional-based GUI to simplify implementation of a myriad of operating modes.

16 Claims, 3 Drawing Sheets

| Contact Type | Gi | Ji | Qi |
|---|---|---|---|
| Rigid | $\begin{bmatrix} I - \hat{r}_i \\ 0 - I \end{bmatrix}$ | $\begin{bmatrix} J_{ve} \\ J_{wi} \end{bmatrix}$ | $\begin{pmatrix} \omega \times (\omega \times \hat{r}_i) + 2\omega \times V_{\hat{r}el_i} \\ 0 \end{pmatrix}$ |
| Point | $\begin{bmatrix} I - \hat{r}_i \\ 0 \quad 0 \end{bmatrix}$ | $\begin{bmatrix} J_{vi} \\ 0 \end{bmatrix}$ | $\begin{pmatrix} \omega \times (\omega \times \hat{r}_i) + 2\omega \times V_{\hat{r}el_i} \\ 0 \end{pmatrix}$ |
| No contact | $[0 \quad 0]$ | $\begin{bmatrix} J_{vi} \\ J_{wi} \end{bmatrix}$ | $(-k_p(x_i - x_i^*) - k_d \dot{x}_i)$ |

FIG. 3

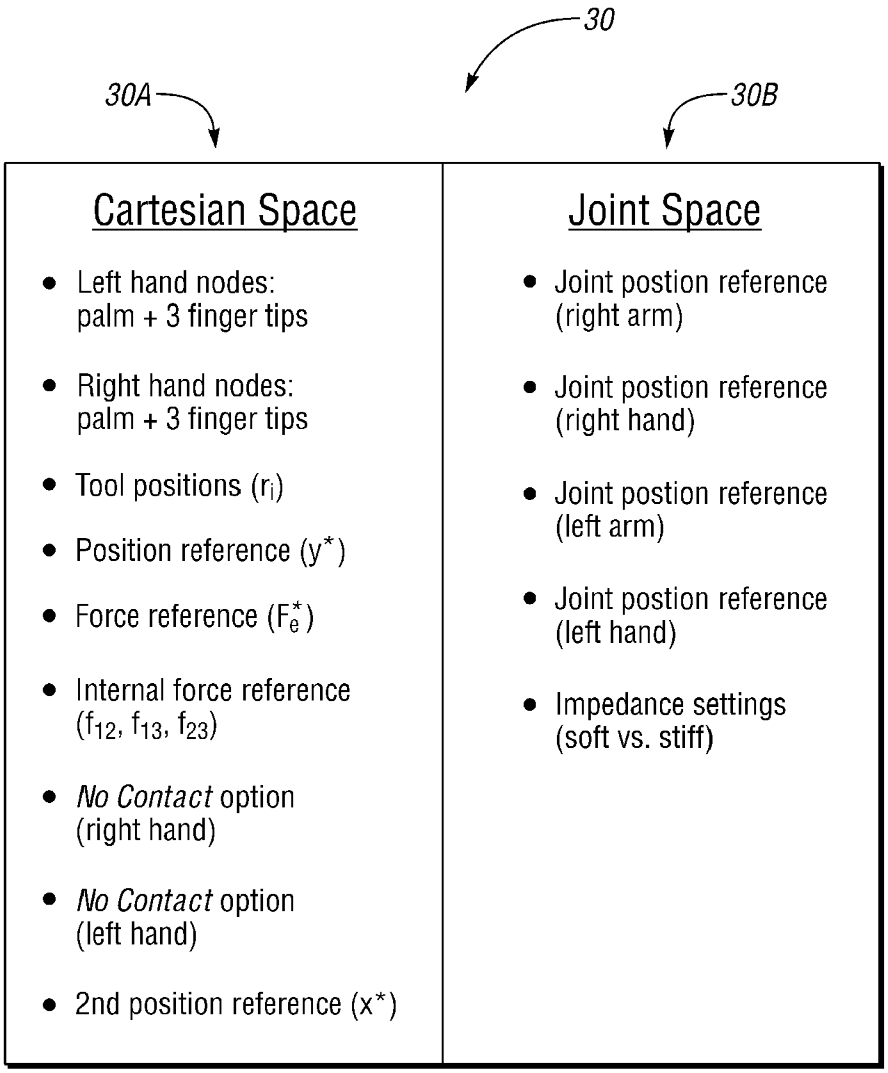

FIG. 4

METHOD AND APPARATUS FOR AUTOMATIC CONTROL OF A HUMANOID ROBOT

CROSS-REFERENCE TO RELATED APPLICATIONS

The present application claims the benefit of and priority to U.S. Provisional Application No. 61/174,316 filed on Apr. 30, 2009.

STATEMENT REGARDING FEDERALLY SPONSORED RESEARCH OR DEVELOPMENT

This invention was made with government support under NASA Space Act Agreement number SAA-AT-07-003. The government may have certain rights in the invention.

TECHNICAL FIELD

The present invention relates to a system and method for controlling a humanoid robot having a plurality of joints and multiple degrees of freedom.

BACKGROUND OF THE INVENTION

Robots are automated devices that are able to manipulate objects using a series of links, which in turn are interconnected via robotic joints. Each joint in a typical robot represents at least one independent control variable, i.e., a degree of freedom (DOF). End-effectors are the particular links used to perform a task at hand, e.g., grasping a work tool or an object. Therefore, precise motion control of the robot may be organized by the level of task specification: object level control, which describes the ability to control the behavior of an object held in a single or cooperative grasp of a robot, end-effector control, and joint-level control. Collectively, the various control levels achieve the required robotic mobility, dexterity, and work task-related functionality.

Humanoid robots are a particular type of robot having an approximately human structure or appearance, whether a full body, a torso, and/or an appendage, with the structural complexity of the humanoid robot being largely dependent upon the nature of the work task being performed. The use of humanoid robots may be preferred where direct interaction is required with devices or systems that are specifically made for human use. The use of humanoid robots may also be preferred where interaction is required with humans, as the motion can be programmed to approximate human motion such that the task queues are understood by the cooperative human partner. Due to the wide spectrum of work tasks that may be expected of a humanoid robot, different control modes may be simultaneously required. For example, precise control must be applied within the different control spaces noted above, as well as control over the applied torque or force of a given motor-driven joint, joint motion, and the various robotic grasp types.

SUMMARY OF THE INVENTION

Accordingly, a robotic control system and method are provided herein for controlling a humanoid robot via an impedance-based control framework as set forth in detail below. The framework allows for a functional-based graphical user interface (GUI) to simplify implementation of a myriad of operating modes of the robot. Complex control over a robot having multiple DOF, e.g., over 42 DOF in one particular embodiment, may be provided via a single GUI. The GUI may be used to drive an algorithm of a controller to thereby provide diverse control over the many independently-moveable and interdependently-moveable robotic joints, with a layer of control logic that activates different modes of operation.

Internal forces on a grasped object are automatically parameterized in object-level control, allowing for multiple robotic grasp types in real-time. Using the framework, a user provides functional-based inputs through the GUI, and then the control and an intermediate layer of logic deciphers the input into the GUI by applying the correct control objectives and mode of operation. For example, by selecting a desired force to be imparted to the object, the controller automatically applies a hybrid scheme of position/force control in decoupled spaces.

Within the scope of the invention, the framework utilizes an object impedance-based control law with hierarchical multi-tasking to provide object, end-effector, and/or joint-level control of the robot. Through a user's ability in real-time to select both the activated nodes and the robotic grasp type, i.e., rigid contact, point contact, etc., a predetermined or calibrated impedance relationship governs the object, end-effector, and joint spaces. Joint-space impedance is automatically shifted to the null-space when object or end-effector nodes are activated, with joint space otherwise governing the entire control space as set forth herein.

In particular, a robotic system includes a humanoid robot having a plurality of joints adapted for imparting force control, and a controller having an intuitive GUI adapted for receiving input signals from a user, from pre-programmed automation, or from a network connection or other external control mechanism. The controller is electrically connected to the GUI, which provides the user with an intuitive or graphical programming access to the controller. The controller is adapted to control the plurality of joints using an impedance-based control framework, which in turn provides object level, end-effector level, and/or, joint space-level control of the humanoid robot in response to the input signal into the GUI.

A method for controlling a robotic system having the humanoid robot, controller, and GUI noted above includes receiving the input signal from the user using the GUI, and then processing the input signal using a host machine to control the plurality of joints via an impedance-based control framework. The framework provides object level, end-effector level, and/or joint space-level control of the humanoid robot.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 3 is a table describing sub-matrices according to the particular contact type used with the robot shown in FIG. 1;

FIG. 4 is a table describing inputs for a graphical user interface (GUI);

DESCRIPTION OF THE PREFERRED EMBODIMENT

Figure 1:
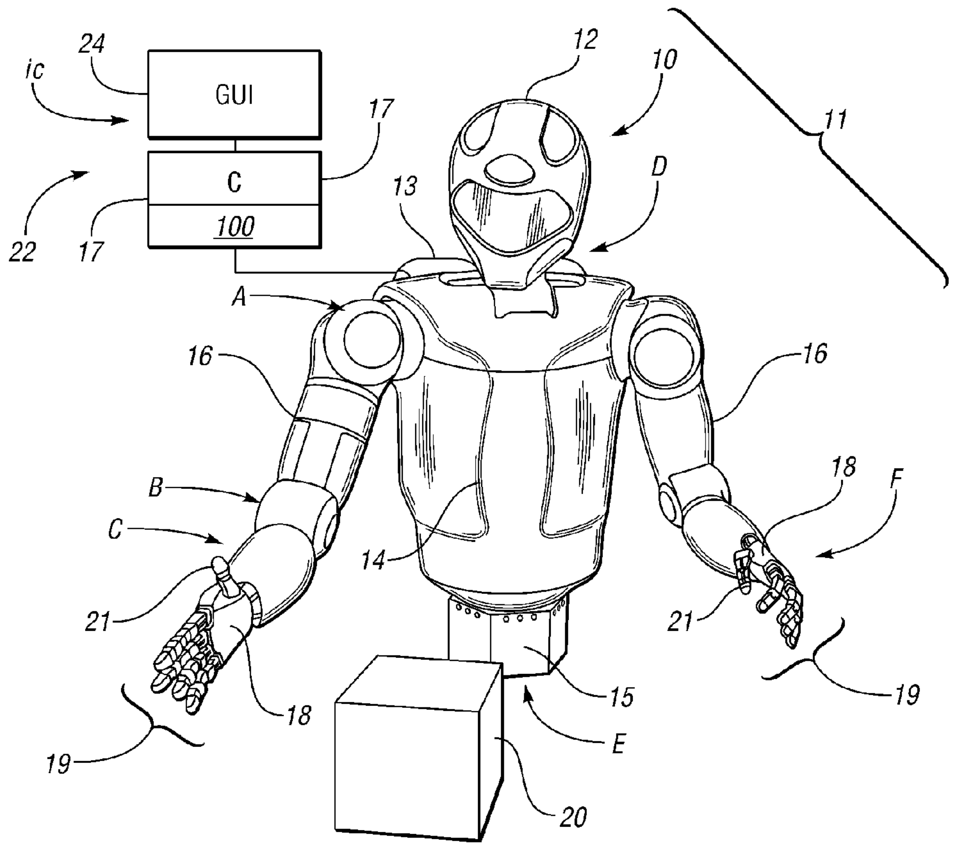
FIG. 1 is a schematic illustration of a robotic system having a humanoid robot that is controllable using an object impedance-based control framework in accordance with the invention.

With reference to the drawings, wherein like reference numbers refer to the same or similar components throughout the several views, and beginning with FIG. 1, a robotic system 11 is shown having a robot 10, shown here as a dexterous humanoid, that is controlled via a control system or controller (C) 22. The controller 22 provides motion control over the robot 10 by way of an algorithm 100, i.e., an impedance-based control framework described below.

The robot 10 is adapted to perform one or more automated tasks with multiple degrees of freedom (DOF), and to perform other interactive tasks or control other integrated system components, e.g., clamping, lighting, relays, etc. According to one embodiment, the robot 10 is configured with a plurality of independently and interdependently-moveable robotic joints, such as but not limited to a shoulder joint, the position of which is generally indicated by arrow A, an elbow joint that is generally (arrow B), a wrist joint (arrow C), a neck joint (arrow D), and a waist joint (arrow E), as well as the various finger joints (arrow F) positioned between the phalanges of each robotic finger 19.

Each robotic joint may have one or more DOF. For example, certain compliant joints such as the shoulder joint (arrow A) and the elbow joint (arrow B) may have at least two DOF in the form of pitch and roll. Likewise, the neck joint (arrow D) may have at least three DOF, while the waist and wrist (arrows E and C, respectively) may have one or more DOF. Depending on task complexity, the robot 10 may move with over 42 DOF. Each robotic joint contains and is internally driven by one or more actuators, e.g., joint motors, linear actuators, rotary actuators, and the like.

The robot 10 may include components such as a head 12, torso 14, waist 15, arms 16, hands 18, fingers 19, and thumbs 21, with the various joints noted above being disposed within or between these components. The robot 10 may also include a task-suitable fixture or base (not shown) such as legs, treads, or another moveable or fixed base depending on the particular application or intended use of the robot. A power supply 13 may be integrally mounted to the robot 10, e.g., a rechargeable battery pack carried or worn on the back of the torso 14 or another suitable energy supply, or which may be attached remotely through a tethering cable, to provide sufficient electrical energy to the various joints for movement of the same.

The controller 22 provides precise motion control of the robot 10, including control over the fine and gross movements needed for manipulating an object 20 that may be grasped by the fingers 19 and thumb 21 of one or more hands 18. The controller 22 is able to independently control each robotic joint and other integrated system components in isolation from the other joints and system components, as well as to interdependently control a number of the joints to fully coordinate the actions of the multiple joints in performing a relatively complex work task.

Still referring to FIG. 1, the controller 22 may include multiple digital computers or data processing devices each having one or more microprocessors or central processing units (CPU), read only memory (ROM), random access memory (RAM), erasable electrically-programmable read only memory (EEPROM), a high-speed clock, analog-to-digital (A/D) circuitry, digital-to-analog (D/A) circuitry, and any required input/output (I/O) circuitry and devices, as well as signal conditioning and buffer electronics. Individual control algorithms resident in the controller 22 or readily accessible thereby may be stored in ROM and automatically executed at one or more different control levels to provide the respective control functionality.

The controller 22 may include a server or host machine 17 configured as a distributed or a central control module, and having such control modules and capabilities as might be necessary to execute all required control functionality of the robot 10 in the desired manner. Additionally, the controller 22 may be configured as a general purpose digital computer generally comprising a microprocessor or central processing unit, read only memory (ROM), random access memory (RAM), electrically-erasable programmable read only memory (EEPROM), a high speed clock, analog-to-digital (A/D) and digital-to-analog (D/A) circuitry, and input/output circuitry and devices (I/O), as well as appropriate signal conditioning and buffer circuitry. Any algorithms resident in the controller 22 or accessible thereby, including an algorithm 100 for executing the framework described in detail below, may be stored in ROM and executed to provide the respective functionality.

The controller 22 is electrically connected to a graphical user interface (GUI) 24 providing user access to the controller. The GUI 24 provides user control of a wide spectrum of tasks, i.e., the ability to control motion in the object, end-effector, and/or joint spaces or levels of the robot 10. The GUI 24 is simplified and intuitive, allowing a user, through simple inputs, to control the arms and the fingers in different intuitive modes by inputting an input signal (arrow $i_C$), e.g., a desired force imparted to the object 20. The GUI 24 is also capable of saving mode changes so that they can be executed in a sequence at a later time. The GUI 24 may also accept external control triggers to process a mode change, e.g., via a teach-pendant that is attached externally, or via PLC controlling the flow of automation through a network connection. Various embodiments of the GUI 24 are possible within the scope of the invention, with two possible embodiments described below with reference to FIGS. 5A and 5B.

In order to perform a range of manipulation tasks using the robot 10, a wide range of functional control over the robot is required. This functionality includes hybrid force/position control, impedance control, cooperative object control with diverse grasp types, end-effector Cartesian space control, i.e., control in the XYZ coordinate space, and joint space manipulator control, and with a hierarchical prioritization of the multiple control tasks. Accordingly, the present invention applies an operational space impedance law and decoupled force and position to the control of the end-effectors of robot 10, and to control of object 20 when gripped by, contacted by, or otherwise acted upon by one or more end-effectors of the robot, such as the hand 18. The invention provides for a parameterized space of internal forces to control such a grip. It also provides a secondary joint space impedance relation that operates in the null-space of the object 20 as set forth below.

Still referring to FIG. 1, the controller 22 accommodates at least two grasp types, i.e., rigid contacts and point contacts, and also allows for mixed grasp types. Rigid contacts are described by the transfer of arbitrary forces and moments, such as a closed hand grip. Point contacts transfer only force, e.g., a finger tip. The desired closed-loop behavior of the object 20 may be defined by the following impedance relationship:

$$M_o\ddot{y} + B_o\dot{y} + N_{FT}K_o\Delta y = F_e - F_e^*$$

$$\dot{y} = \begin{pmatrix} p \\ \omega \end{pmatrix}$$

where Mo, Bo, and Ko are the commanded inertia, damping, and stiffness matrices, respectively. The variable p is the position of the object reference point, ω is the angular velocity of the object, $F_e$ and $F_e$* represent the actual and desired external wrench on the object 20. Δy is the position error (y−y*). $N_{FT}$ is the null-space projection matrix for vector, $F_e^{*T}$, and may be described as follows:

$$N_{FT} = \begin{cases} I - F_e^* F_e^{*+}, & \|F_e^*\| \neq 0 \\ I, & \|F_e^*\| = 0 \end{cases}$$

In the above equation, the superscript (+) indicates the pseudo-inverse of the respective matrix, and I is the identity matrix. $N^{FT}$ keeps the position and force control automatically decoupled by projecting the stiffness term into the space orthogonally to the commanded force, with the assumption that the force control direction consists of one DOF. To decouple the higher order dynamics as well, $M_o$ and $B_o$ need to be selected diagonally in the reference frame of the force. This extends to include the ability to control forces in more than one direction.

This closed-loop relation applied a "hybrid" scheme of force and motion control in the orthogonal directions. The impedance law applies a second-order position tracker to the motion control position directions while applying a second-order force tracker to the force control directions, and should be stable given positive-definite values for the matrices. The formulation automatically decouples the force and position control directions. The user simply inputs a desired force, i.e., $F^*_e$, and the position control is projected orthogonally into the null space. If zero desired force is input, the position control spans the full space.

Figure 2:
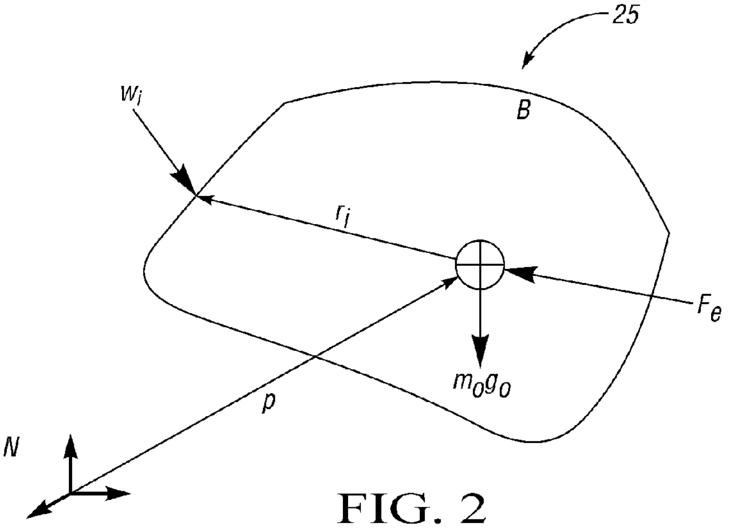
FIG. 2 is a schematic illustration of forces and coordinates related to an object that may be acted upon by the robot shown in FIG. 1.

Referring to FIG. 2, a free-body diagram 25 is shown of object 20 of FIG. 1 and a coordinate system. N and B represent the ground and body reference frames, respectively. $r_i$ is the position vector from the center of mass to contact point i, where i=l, . . . n. $w_i=(f_i, n_i)$ represents the contact wrench from contact point i, where $f_i$ and $n_i$ are the force and moment, respectively. The velocity and acceleration of contact point i can be represented by the following standard kinematic relationships:

$$v_i=\dot{p}+\omega\times r_i+v_{rel_i}$$

$$\omega_i=\omega+\omega_{rel_i}$$

$$\dot{v}_i=\ddot{p}+\dot{\omega}\times r_i+\omega\times(\omega\times r_i)+2\omega\times v_{rel_i}+\alpha_{rel_i}$$

$$\dot{\omega}=\dot{\omega}+\dot{\omega}_{rel_i}$$

where $v_i$ represents the velocity of the contact point, and $\omega_i$ represents the angular velocity of the end-effector i. $v_{rel}$ and $\alpha_{rel}$ are defined as the first and second derivative, respectively, or $r_i$ in the B frame.

$$v_{rel_i} = \frac{{}^B d}{dt} r_i,\ a_{rel_i} = \frac{{}^B d}{dt} v_{rel_i}$$

In other words, they represent the motion of the point relative to the body. The terms become zero when the point is fixed in the body.

End-Effector Coordinates: the framework of the present invention is designed to accommodate at least the two grasp types described above, i.e., rigid contacts and point contacts. Since each type presents different constraints on the DOF, the choice of end-effector coordinates for each manipulator, $x_i$ depends on the particular grasp type. A third grasp type is that of "no contact", which describes an end-effector that is not in contact with the object 20. This grasp type allows control of the respective end-effectors independently of the others. The coordinates may be defined on the velocity level as:

$$\text{Rigid contact: } \dot{x}_i = \begin{pmatrix} v_i \\ \omega_i \end{pmatrix}$$

$$\text{Point contact: } \dot{x}_i = \begin{pmatrix} v_i \\ 0 \end{pmatrix}$$

$$\text{No contact: } \dot{x}_i = \begin{pmatrix} v_i \\ \omega_i \end{pmatrix}$$

Through the GUI 24 shown in FIG. 1, a user may select the desired end-effector(s) to activate, e.g., finger(s) 19, etc. The controller 22 then generates linear and rotational Jacobians for each end-effector, $J_{vi}$ and $J_{\omega i}$, respectively. The final Jacobian for each point, $J_i$, then depends on the contact type such that:

$$\dot{x}_i=j_i\dot{q}.$$

In this formula, q is the column matrix of all the joint coordinates in the system being controlled.

Matrix Notation: the composite end-effector velocity may be defined as: $\dot{x}=[\dot{x}_1^T \ldots \dot{x}_n^T]^T$: where n is the number of active end-effectors, e.g., a finger 19 of the humanoid robot 10 shown in FIG. 1. The velocity and subsequent acceleration may be expressed in matrix notation based on the kinematic relationships set forth above, i.e.:

$$\dot{x}=G\dot{y}+\dot{x}_{rel}$$

$$\ddot{x}=G\ddot{y}+Q+\ddot{x}_{rel}$$

G may be referred to as the grasp matrix, and contains the contact position information. Q is a column matrix containing the centrifugal and coriolus terms. $\dot{x}_{rel}$ and $\ddot{x}_{rel}$ are column matrices containing the relative motion terms.

The structure of the matrices G, Q, and J vary according to the contact types in the system. They can be constructed of submatrices representing each manipulator i such that:

$$G = \begin{bmatrix} G_1 \\ \vdots \\ G_n \end{bmatrix},\ J = \begin{bmatrix} J_1 \\ \vdots \\ J_n \end{bmatrix},\ Q = \begin{bmatrix} Q_1 \\ \vdots \\ Q_n \end{bmatrix}.$$

Referring to FIG. 3, the sub-matrices may be displayed according to the particular contact type. $\hat{r}$ refers to the skew-symmetric matrix equivalent of the cross-product for vector r. In low velocity applications, Q may be neglected. Note that the Jacobian for a point contact contains only the linear Jacobian. Hence, only position is controlled for this type of contact, and not orientation.

The third case in the table of FIG. 3 applies a proportional-derivative (PD) controller, which may be part of the controller 22 of FIG. 1 or a different device, on the end-effector position, where $k_p$ and $k_d$ are the scalar gains. This allows for the position of end-effector i to be controlled independently of the object 20 of FIG. 1. It also means that the respective end-effector does not observe the Cartesian impedance behavior.

When both $\dot{x}_{rel}$ and $\ddot{x}_{rel}$ equal zero, the end-effectors perfectly satisfy the rigid body condition, i.e., producing no change to internal forces between them. $\ddot{x}_{rel}$ may be used to control the desired internal forces in a grasped object. To ensure that $\ddot{x}_{rel}$ does not affect the external forces, it must lie in the space orthogonal to G, referred to herein as the "internal space", i.e., the same space containing the internal forces. The projection matrix for this space, or the null-space $G^T$, follows:

$$N_G = I - GG^+$$

Relative accelerations may be constrained to the internal space:

$$\ddot{x}_{rel} \doteq N_{G^T}\alpha$$

where η is an arbitrary column matrix of internal accelerations.

This condition ensures that $\ddot{x}_{rel}$ produces no net effect on the object-level accelerations, leaving the external forces unperturbed. To validate this claim, one may solve for the object acceleration and show that the internal accelerations have zero contribution to $\ddot{y}$, i.e.,:

$$\begin{aligned} \ddot{y} &= G^+(\dot{x} - Q) - G^+\ddot{x}_{rel} \\ &= G^+(\dot{x} - Q) - G^+ N_{G^T} a \\ &= G^+(\dot{x} - Q) - 0 \end{aligned}$$

Internal Forces: there are two requirements for controlling the internal forces within the above control framework. First, the null-space is parameterized with physically relevant parameters, and second, the parameters must lie in the null-space of both grasp types. Both requirements are satisfied by the concept of interaction forces. Conceptually, by drawing a line between two contact points, interaction forces may be defined as the difference between the two contact forces that are projected along that line. One may show that the interaction wrench, i.e., the interaction forces and moments, also lies in the null-space of the rigid contact case.

One may consider a vector at a contact point normal to the surface and pointing into the object 20 of FIG. 1. Forces at point-contacts must have normal components that are positive with sufficient magnitude, both to maintain contact with the object 20 and to prevent slip with respect to such an object. In a proper grasp, for example within the hand 18 of FIG. 1, the interaction forces will never all be tangential to the surface of the object 20. Hence, some minimum interaction force always exists such that the normal component is greater than a lower bound.

With respect to the interaction accelerations, these may be defined as: $\doteq$ wherein the desired relative accelerations should lie in the interaction directions. In the above equation, α may be defined as the column matrix of interaction accelerations, $\alpha_{ij}$, where $\alpha_{ij}$ represents the relative linear acceleration between points i and j. Hence, the relative acceleration seen by point i is:

$$\ddot{x}_{rel_i} = \begin{pmatrix} \sum_{j=1}^{n} a_{ij}u_{ij} \\ 0 \end{pmatrix}$$

where $u_{ij}$ represents the unit vector pointing along the axis from point i to j.

$$u_{ij} = \begin{cases} \dfrac{r_j - r_i}{\|r_j - r_i\|}, & i \neq j \\ 0, & i = j \end{cases}$$

In addition, $u_{ij}=0$ if either i or j represents a no "contact" point. The interaction accelerations are then used to control the interaction forces using the following PI regulator, where $k_p$ and $k_i$ are constant scalar gains:

$$\alpha_{ij} = -k_p(f_{ij} - f^*_{ij}) - k_i\int(f_{ij} - f^*_{ij})dt$$

wherein $f_{ij}$ is the interaction force between points i and j.

$$f_{ij} = (f_i - f_j)\cdot u_{ij}$$

This definition allows us to introduce a space that parameterizes the interaction components, $N_{int}$. As used herein, $N_{int}$ is a subspace of the full null-space, $N_{G^T}$, except in the point-contact case where it spans the whole null-space:

$$\ddot{x} = Q + N_{int}\alpha$$

$N_{int}$ consists of the interaction direction vectors ($u_{ij}$) and can be constructed from the equation:

$$\ddot{x}_{rel_i} = \begin{pmatrix} \sum_{j=1}^{n} a_{ij}u_{ij} \\ 0 \end{pmatrix}.$$

It may be shown that $N_{int}$ is orthogonal to G for both contact types. Consider an example with two contact points. In this case:

$$\ddot{x}_{rel_1} = \begin{pmatrix} a_{12}u_{12} \\ 0 \end{pmatrix}, \; \ddot{x}_{rel_2} = \begin{pmatrix} a_{21}u_{21} \\ 0 \end{pmatrix}$$

Noting that $u_{ij}=-u_{ji}$ and $\alpha_{ij}=\alpha_{ji}$ the following simple matrix expressions result:

$$N_{int} = \begin{bmatrix} u_{12} \\ 0 \\ -u_{12} \\ 0 \end{bmatrix}, \; a = (a_{12})$$

The expression for a three contact case follows as:

$$N_{int} = \begin{bmatrix} u_{12} & u_{13} & 0 \\ 0 & 0 & 0 \\ -u_{12} & 0 & u_{23} \\ 0 & 0 & 0 \\ 0 & u_{13} & -u_{23} \\ 0 & 0 & 0 \end{bmatrix}, \; a = \begin{pmatrix} a_{12} \\ a_{13} \\ a_{23} \end{pmatrix}$$

Control Law—Dynamics Model: the following equation models the full system of manipulators, assuming external forces acting only at the end-effectors:

$$M\ddot{q}+c+J^T\omega=\tau$$

where q is the column matrix of generalized coordinates, M is the joint-space inertia matrix, c is the column matrix of Coriolus, centrifugal and gravitational generalized forces, T is the column matrix of joint torques, and w is the composite column matrix of the contact wrenches.

Control Law—Inverse Dynamics: the control law based on inverse dynamics may be formulated as:

$$\tau=M\ddot{q}^*+c+J^T\omega$$

where $\ddot{q}^*$ is the desired joint-space acceleration. It may be derived from the desired end-effector acceleration ($\ddot{x}^*$) as follows:

$$\ddot{x}^*=J\ddot{q}^*+\dot{J}\dot{q}$$

$$\ddot{q}^*=J+(\ddot{x}^*-\dot{J}\dot{q})+N_J\ddot{q}_{ns}$$

where $\ddot{q}_{ns}$ is an arbitrary vector projected into the null-space of J. It will be utilized for a secondary impendance task hereinbelow. $N_J$ denotes the null-space projection operator for matrix J.

$$N_J = I - J^+J, \; J^+ = \begin{cases} J^+, & J \neq 0 \\ 0, & J = 0 \end{cases}$$

The desired acceleration on the end-effector and object level may then be derived from the previous equations. The strength of this object force distribution method is that it does not need a model of the object. Conventional methods may involve translating the desired motion of the object into a commanded resultant force, a step that requires an existing high-quality dynamic model of the object. This resultant force is then distributed to the contacts using the inverse of G. The end-effector inverse dy-namics then produces the commanded force and the commanded motion. In the method presented herein, introducing the sensed end-effector forces and conducting the allocation in the acceleration domain eliminates the need for a model of the object.

Control Law—Estimation: the external wrench ($F_e$) on the object 20 of FIG. 1 cannot be sensed, however it may be estimated from the other forces on the object 20. If the object model is well known, the full dynamics may be used to estimate $F_e$. Otherwise, a quasi-static approximation may be employed. Additionally, the velocity of object 20 may be estimated with the following least squares error estimate of the system as a rigid body:

$$\dot{y}=G^+\dot{x}$$

When an end-effector is designated as the "no contact" type as noted above, G will contain a row of zeros. A Singular Value Decomposition (SVD)-based pseudo-inverse calculation produces $G^+$ with the corresponding column zeroed out. Hence, the velocity of the non-contact point will not effect the estimation. Alternatively, the pseudo-inverse may be computed with a standard closed-form solution. In this case, the rows of zeros need to be removed before the calculation and then reinstated as corresponding columns of zeros. The same applies to the J matrix, which may contain rows of zeros as well.

Second Impedance Law: the redundancy of the manipulators allows for a secondary task to act in the null-space of the object impedance. The following joint-space impedance relation defines a secondary task:

$$M_j\ddot{q}+B_j\dot{q}+K_j\Delta q=\tau_e$$

wherein $\tau_e$ represents the column matrix of joint torques produced by external forces. It may be estimated from the equation of motion, i.e., $M\ddot{q}+c+J^T\omega=\tau$, such that:

$$\tau_e=M\ddot{q}+c-\tau.$$

This formula in turn dictates the following desired acceleration for the null-space of $$\ddot{q}^*=J^+(\ddot{x}^*-\dot{J}\dot{q})+N_J\ddot{q}_{ns} \text{ i.e., } \ddot{q}_{ns}=M_j^{-1}(\tau_c-B_j\dot{q}-K_j\Delta q).$$

It may be shown that this implementation produces the following close-loop relation in the null-space of the manipulators. Note that $N_J$ is an orthogonal projection matrix that finds the minimum-error projection into the null-space.

$$N_J[\ddot{q}-M_j^{-1}(\tau_c-B_j\dot{q}-K_j\Delta q)]=0$$

Zero Force Feedback: the following results from the above equations:

$$\tau = (J^T - MJ^+GM_o^{-1}G^T)w + c - MJ^+GM_o^{-1}(F_e^* + B_o\dot{y} + N_{FT}K_o\Delta y + m_og_o) + MJ^+(Q + N_{int}a - \dot{J}\dot{q}) + MN_JM_j^{-1}(\tau_e - B_j\dot{q} - K_j\Delta q)$$

If reliable force sensing is not available in the manipulators, the impedance relation can be adjusted to eliminate the need for the sensing. Through an appropriate selection of the desired impedance inertias, $M_o$ and $M_i$, the force feedback terms can be eliminated. The appropriate values can be easily determined from the previous equation.

User Interface: through a simple user interface, e.g., the GUI 24 of FIG. 1, the controller 22 may operate the humanoid robot 10 in the whole range of modes desired. In full functionality mode, the controller 22 controls object 20 with a hybrid impedance relationship, applies internal forces between the contacts, and implements a joint-space impedance relation in the redundant space. Using only simple logic and an intuitive interface, the proposed framework may easily switch between all or some of this functionality based on a set of control inputs, as represented in FIG. 1 by arrow $i_c$.

Referring to FIG. 4, inputs 30 from the GUI 24 of FIG. 1 are displayed in a table. The inputs 30 may be categorized as belonging to either the Cartesian space, i.e., inputs 30A, or the joint space, i.e., inputs 30B. A user may easily switch between position and force control by providing a reference external force. The user may also switch the system between applying impedance control on the object, end-effector, and/or joint levels simply by selecting the desired combination of end-effectors. A more complete listing of the modes and how they are evoked follows:

Cartesian position control: when $F^*_e=0$.

Cartesian hybrid force/position control: when $F^*_e \neq 0$. Force control is applied in the direction of $F^*_e$ and position control is applied in the orthogonal directions.

Joint position control: when no end-effectors are selected. The joint-space impedance relation controls the full joint-space of the system.

End-effector impedance control: when only one end-effector is selected (others can be selected and marked "no contact"). The hybrid Cartesian impedance law is applied to the end-effector.

Object impedance control: when at least two end-effectors are selected (and not assigned "no contact").

Finger joint-space control: anytime a finger tip is not selected as an end-effector, it will be controlled by the joint-space impedance relation. This is the case even if the palm is selected.

Grasp types: rigid contact (when palm is selected); point contact (when finger is selected).

Figure 5A:
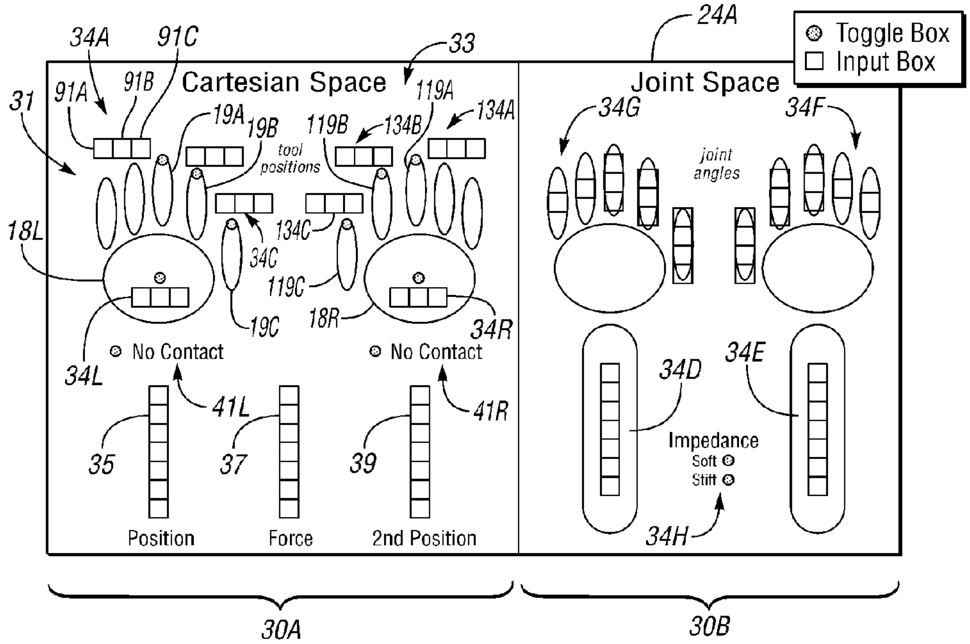
FIG. 5A is a schematic illustration of a GUI usable with the system of FIG. 1 according to one embodiment.

Referring to FIG. 5A with FIG. 4, a sample GUI 24A is shown having the Cartesian space of inputs 30A and the Joint space of inputs 30B. The GUI 24A may present left side and right side nodes 31 and 33, respectively, for control of left and right-hand sides of the robot 10 of FIG. 1, e.g., the right and left hands 18 and fingers 19 of FIG. 1. Top level tool position ($r_i$), position reference ($y^*$), and force reference ($F^*_e$) are selectable via the GUI 24A, as noted by the three adjacent boxes 91A, 91B, and 91C. The left side nodes 31 may include the palm of a hand 18 and the three finger tips of the primary fingers 19, represented as 19A, 19B, and 19C. Likewise, the right side nodes 33 may include the palm of the right hand 18 and the three finger tips of the primary fingers 119A, 119B, and 119C of that hand.

Each primary finger 19R, 119R, 19L, 119L has a corresponding finger interface, i.e., 34A, 134A, 34B, 134B, 34C, 134C, respectively. Each palm of a hand 18L, 18R includes a palm interface 34L, 34R. Interfaces 35, 37, and 39 respectively provide a position reference, an internal force reference ($f_{12}$, $f_{13}$, $f_{23}$), and a $2^{nd}$ position reference ($x^*$). No contact options 41L, 41R are provided for the left and right hands, respectively.

Joint space control is provided via inputs 30B. Joint position of the left and right arms 16L, 16R may be provided via interfaces 34D, E. Joint position of the left and right hands 18L, 18R may be provided via interfaces 34F, G. Finally, a user may select a qualitative impedance type or level, i.e., soft or stiff, via interface 34H, again provided via the GUI 24 of FIG. 1, with the controller 22 acting on the object 20 with the selected qualitative impedance level.

Figure 5B:
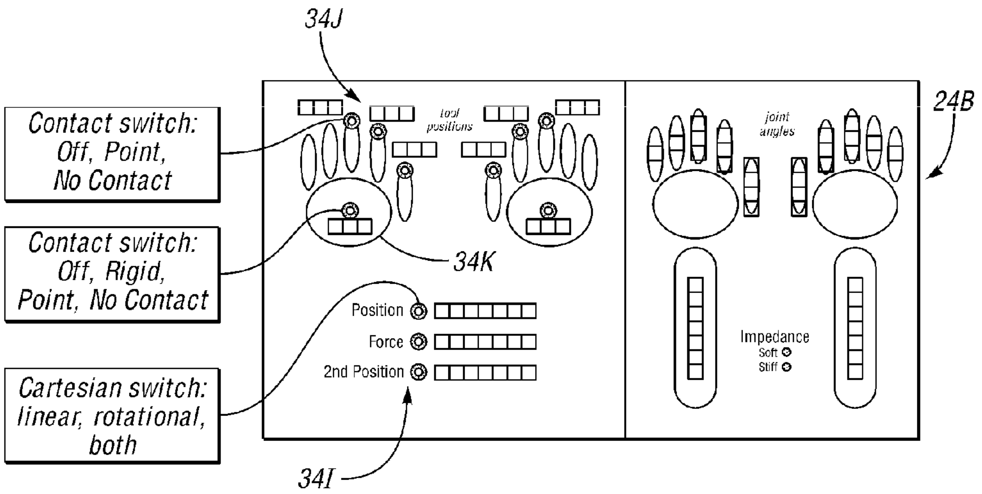
FIG. 5B is a schematic illustration of a GUI according to another embodiment.

Referring to FIG. 5B, an expanded GUI 24B is shown providing greater flexibility relative to the embodiment of FIG. 5A. Added options include allowing Cartesian impedance to control only linear or rotation components, as opposed to only both, via interface 34I, allowing a "no contact" node to coexist with a contact node on the same hand via interface 34J, and adding flexibility of selecting contact type for each active node via interface 34K.

While the best modes for carrying out the invention have been described in detail, those familiar with the art to which this invention relates will recognize various alternative designs and embodiments for practicing the invention within the scope of the appended claims.

The invention claimed is:

1. A robotic system comprising:

a humanoid robot having a plurality of robotic joints and end-effectors adapted for imparting a force to an object;

a graphical user interface (GUI) adapted for receiving an input signal from a user describing at least a reference external force in the form of a desired input force to be imparted to the object, wherein the GUI includes a Cartesian space of inputs, a joint space of inputs, and a selectable qualitative impedance level; and a controller that is electrically connected to the GUI, wherein the GUI provides the user with programming access to the controller and allows the user to switch between position control and force control of the humanoid robot solely by selecting the reference external force, and between impedance control on the object, end-effector, and joint level solely by selecting a desired combination of the end-effectors.

2. The system of claim 1, wherein the GUI graphically displays each of the Cartesian space of inputs and the joint space of inputs for each of a left side node and a right side node of the humanoid robot.

3. The system of claim 1, wherein the controller is adapted to parameterize a predetermined set of internal forces of the humanoid robot in the object-level of control to thereby allow for multiple grasp types in real-time, the multiple grasp types including at least a rigid contact grasp type and a point contact grasp type.

4. The system of claim 1, wherein the GUI is a functional-based device that uses the Cartesian space of inputs, the joint space of inputs, and the qualitative impedance level as a set of intuitive inputs,. and a layer of interpretive logic that deciphers the input into the GUI by applying the correct control objectives and mode of operation, to command all joints in the humanoid robot with a set of impedance commands for at least one of the object, the end-effector, and the joint space level of control.

5. The system of claim 1, wherein the controller is adapted for executing hybrid force and position control in the Cartesian space by projecting a stiffness term of an impedance relationship into a null space orthogonally to the received reference force to automatically decouple force and position directions.

6. A controller for a robotic system, wherein the system includes a humanoid robot having a plurality of robotic joints adapted for force control with respect to an object being acted upon by the humanoid robot, and a graphical user interface (GUI) electrically connected to the controller that is adapted for receiving an input signal from a user, the controller comprising:

a host machine having memory; and an algorithm executable from the memory by the host machine to thereby control the plurality of joints using an impedance-based control framework, wherein the impedance-based control framework includes a function of commanded inertia, damping, and stiffness matrices;

wherein execution of the algorithm by the host machine provides at least one of an object level, end-effector level, and joint space-level of control of the humanoid robot in response to the input signal into the GUI, the input signal including at least a desired input force to be imparted to the object; and wherein the host machine is configured to switch between impedance control on the object, the end-effector, and the joint level when a user selects, via the input signal to the GUI, a desired combination of the end-effectors.

7. The controller of claim 6, wherein the algorithm is adapted for executing an intermediate layer of logic to decipher the input signal entered via the GUI.

8. The controller of claim 6, wherein the host machine automatically decouples a force direction and a position control direction of the humanoid robot using a null-space projection matrix when the user inputs the desired input force, and wherein the position control direction is automatically projected into a null space orthogonally to the input force by execution of the algorithm.

9. The controller of claim 6, wherein the algorithm is adapted to parameterize a predetermined set of internal forces of the humanoid robot in object-level control to thereby allow for multiple grasp types, the multiple grasp types including at least a rigid contact grasp type and a point contact grasp type.

10. The controller of claim 6, wherein the controller is adapted for applying a second-order position tracker to the position control directions while applying a second-order force tracker to the force control directions.

11. The controller of claim 6, wherein the user selects the desired end-effectors of the robot to activate, and wherein the controller generates a linear and a rotational Jacobian for each end-effector in response thereto.

12. The controller of claim 6, wherein the controller is adapted to switch between a position control mode and a force control mode when the user provides the desired input force as a reference external force via the GUI.

13. A method for controlling a robotic system including a humanoid robot having a plurality of joints and end-effectors adapted for imparting a force to an object, a controller, and a graphical user interface (GUI) electrically connected to the controller, wherein the controller is adapted for receiving an input signal from the GUI, the method comprising:

receiving the input signal via the GUI;

processing the input signal using the controller to thereby control the plurality of joints and end-effectors, wherein processing the input signal includes using an impedance-based control framework to provide object level, end-effector level, and joint space-level control of the humanoid robot; and automatically switching between a position control mode and a force control mode via the controller when the user provides a desired input force as the input signal via the GUI, and between impedance control at one of the object, end-effector, and joint levels when the user selects a desired combination of end-effectors of the humanoid robot as the input signal via the GUI.

14. The method of claim 13, wherein the input signal is a desired input force imparted to the object, and wherein processing the input signal includes: automatically decoupling a force control direction and a position control direction when the user inputs the desired input force via the GUI, and projecting the position control direction orthogonally into a null space.

15. The method of claim 13, further comprising: using the controller to apply a second-order position tracker to the position control direction and a second-order force tracker to the force control direction.

16. The method of claim 13, further comprising: parameterizing a predetermined set of internal forces of the humanoid robot in object-level control to thereby allow for multiple grasp types in real-time, including at least a rigid contact grasp type and a point contact grasp type.

* * * * *